(No Model.)
L. R. BUDD.
MOLD FOR EARTH AND STONE FENCES.
No. 244,847. Patented July 26, 1881.
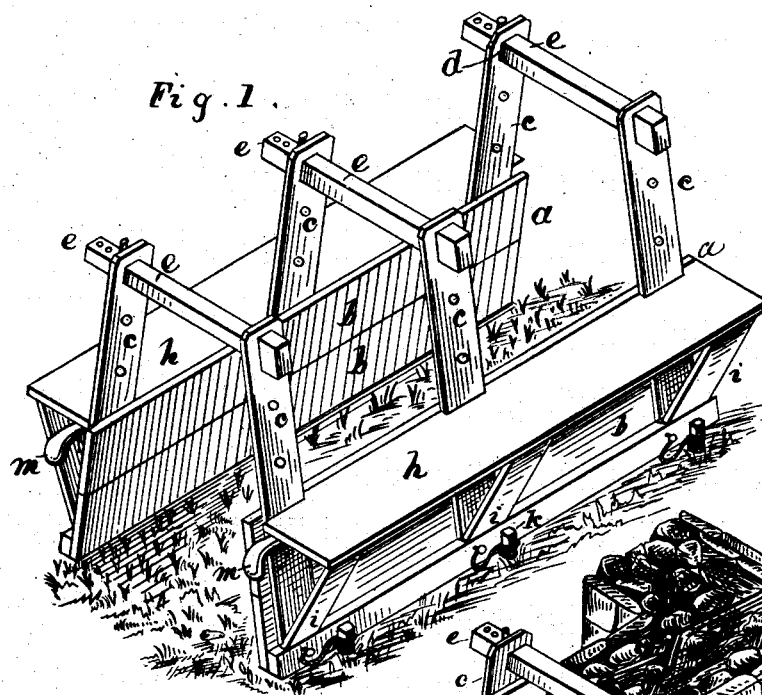
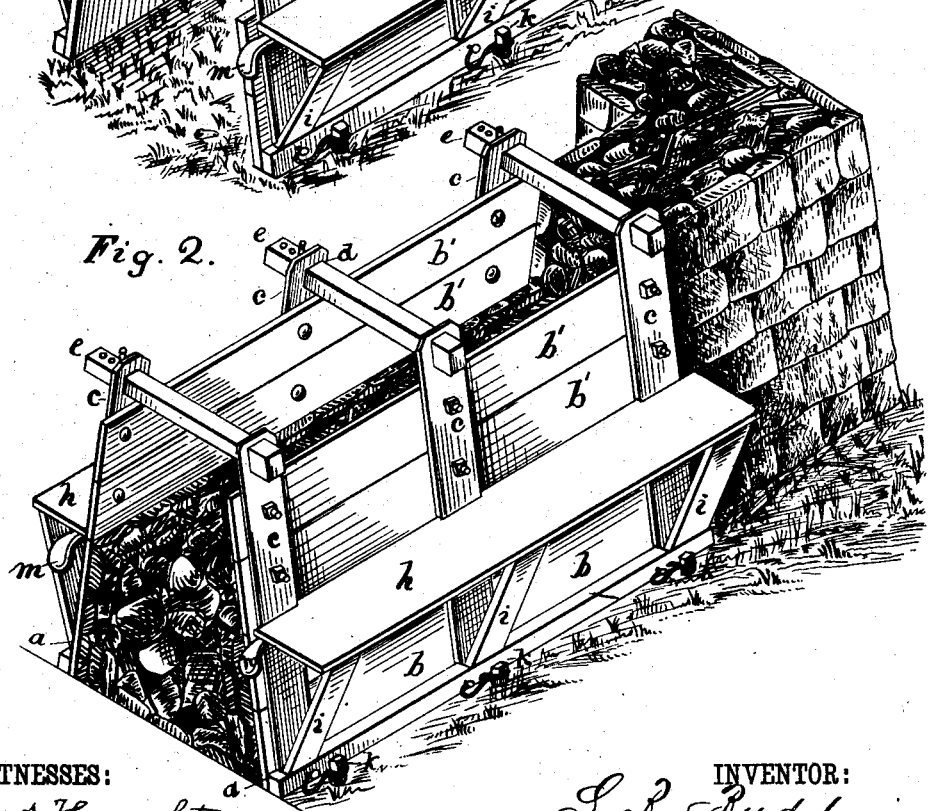
WITNESSES:
Thos. Houghton
John C. Kenon
INVENTOR:
L. R. Budd
BY
ATTORNEYS.
N. PETERS, Photo-Lithographer, Washington, D. C.

UNITED STATES PATENT OFFICE.

LEWIS R. BUDD, OF CAMBRIDGE, TEXAS.

MOLD FOR EARTH AND STONE FENCES.

SPECIFICATION forming part of Letters Patent No. 244,847, dated July 26, 1881.

Application filed May 23, 1881. (No model.)

*To all whom it may concern:*

Be it known that I, LEWIS R. BUDD, of Cambridge, in the county of Clay and State of Texas, have invented a new and useful Improvement in Molds for Earth and Stone Fences; and I do hereby declare that the following is a full, clear, and exact description of the same, reference being had to the accompanying drawings, forming part of this specification, in which—

Figure 1 is a perspective view of my improved mold for earth and stone fences, with the upper boards removed; and Fig. 2 is a perspective view of the same with the upper boards in place.

My invention relates to improvements in molds for constructing earth and stone fences; and it consists of a mold or guide for a solid fence made of sod and earth, or stone and earth, or other material, as hereinafter more fully set forth.

In the accompanying drawings, $a\ a$ represent the longitudinal sides of my improved mold or guide employed in the construction of a solid wall or fence formed of sod and earth, or stone and earth, or other material. Each longitudinal side $a$ of the mold or guide consists of boards $b\ b'$, secured to inclined standards $c$, having eyes $d$ formed on their upper ends, adapted to receive locking-bolts $e$, provided with holes in one of their ends adapted to receive keys, whereby the sides can be adjusted nearer to or farther from each other, which bolts connect together the longitudinal sides $a$ of the molds, when in position, to build the solid fence with the sides inclined and their lower edges resting on the ground. Each longitudinal side $a$ is also provided with a horizontal table, $h$, secured to a horizontal bar bolted to the inclined standards $c$ near their middle, and preferably provided with braces $i\ i$, secured at their upper ends to the outer edge of the table and at their lower ends to the inclined standards $c$. $m\ m$ represent handles secured to the ends of the sides $a$, by means of which the mold can be moved from place to place. The boards $b'$ above the tables $h$ are so secured to the inclined standards $c$ that they can readily be removed or replaced, for purposes hereinafter described.

Stakes $k\ k$, which may be secured by fastenings to the sides are driven into the ground on each side, of the bases of the longitudinal sides of the mold, the lower edges of the sides of the mold resting against the stakes to retain them in position, the sides $a$ of the mold being inclined as desired. The solid fence may be composed of sod and earth, or stone and sod, or stone, or other material, as desired, with or without a ditch. In building the solid fence two men or boys are employed to operate the mold, although it may be operated by one person, and the inclination of the sides of the mold is varied as desired. If the fence is designated to be built of sod and earth or stone and earth, the line stakes are first planted in the ground at a proper distance apart, and the mold is placed in position on the line of stakes, and the stakes $k\ k$ driven into the ground on each side at the base of the mold to retain it in position, and the horizontal boards $b'\ b'$ above the tables are removed.

The material for building the fence is placed on the tables $h$, so as to be convenient to the workmen in building the wall. The fence-builder then gets inside the mold and places the sod or stone, or both, against each inner side of the mold, so as to break joints, and earth is filled in in the middle until the solid fence is built up to a level with the top faces of the tables. The horizontal boards $b'\ b'$ are then replaced and secured to the cross-pieces, and the fence is built up in the same manner to the top of the mold. After one section is finished the sides of the mold are uncoupled at top, the stakes $k\ k$ removed at the base of the mold, the latter is moved forward along the line of fence, and the operation repeated for the next section of the solid fence, and so on for the other sections until the whole line of fence is completed.

Cotton stalks, weeds, and other material of a fibrous nature may be introduced into the fence, which will more firmly bind the whole together.

This fence is solid, extremely cheap, and readily constructed, and is proof against fire, wind, decay, and the passage of animals, large and small.

To form an angle in the fence the sides of the mold are each formed angularly.

The mold may be constructed of wood, iron, or any other suitable material.

I am aware that a sectional frame or box adapted to embrace each side of a wall built within it, and provided with removable side boards and locking-bolts connecting the sides of the box below its top, has heretofore been employed, and I therefore lay no claim, broadly, to such construction, which differs from mine in having no staging or tables on which the material is placed, and differs, also, in arranging the locking-bolts connecting the sides below the top of the box, whereby said locking-bolts are built into the wall and subsequently driven therefrom, leaving apertures in the wall and requiring time and labor in the removal of the bolts embedded in the wall, whereas my locking-bolts connect the sides of the mold above the wall and can readily be removed without forming apertures in the wall.

What I claim as my invention is—

1. The mold herein described, for constructing earth and stone fences, consisting of the inclined adjustable sides $a\ a$, having inclined standards $c$, removable boards $b'$, and boards $b$, tables $h$, and locking-bolts $e$, substantially as described, and for the purpose set forth.

2. The combination, with the sides $a\ a$, having lower boards or metallic pieces, $b$, upper removable boards or metallic pieces, $b'$, and inclined standards $c$, of the tables $h$, locking-bolts $e$, handles $m\ m$, and stakes $k\ k$, substantially as described, and for the purpose set forth.

LEWIS R. BUDD.

Witnesses:
   JOSEPH F. JOHNS,
   JOS. A. CALDWELL.